United States Patent
Lu et al.

(10) Patent No.: US 9,706,425 B2
(45) Date of Patent: Jul. 11, 2017

(54) MEASUREMENT CONFIGURATION METHOD, MEASUREMENT REPORT METHOD, BASE STATION AND USER EQUIPMENT USING THE SAME

(71) Applicant: Telefonaktiebolaget L M Ericsson (publ), Stockholm (SE)

(72) Inventors: Qianxi Lu, Beijing (CN); Rui Fan, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 136 days.

(21) Appl. No.: 14/786,312

(22) PCT Filed: Apr. 24, 2013

(86) PCT No.: PCT/CN2013/074604
§ 371 (c)(1),
(2) Date: Oct. 22, 2015

(87) PCT Pub. No.: WO2014/172854
PCT Pub. Date: Oct. 30, 2014

(65) Prior Publication Data
US 2016/0105818 A1    Apr. 14, 2016

(51) Int. Cl.
*H04W 4/00* (2009.01)
*H04W 24/10* (2009.01)
(Continued)

(52) U.S. Cl.
CPC ............. *H04W 24/10* (2013.01); *H04L 47/12* (2013.01); *H04W 72/04* (2013.01); *H04W 76/046* (2013.01); *H04W 88/08* (2013.01)

(58) Field of Classification Search
CPC ...................................................... H04W 24/10
See application file for complete search history.

(56) References Cited

U.S. PATENT DOCUMENTS

| | | | |
|---|---|---|---|
| 9,491,652 B2 * | 11/2016 | Seo .................... | H04W 24/10 |
| 2003/0003788 A1 * | 1/2003 | Schoepf ............... | H01R 13/53 |
| | | | 439/181 |

(Continued)

FOREIGN PATENT DOCUMENTS

| | | |
|---|---|---|
| CN | 1502212 A | 6/2004 |
| CN | 102271359 A | 12/2011 |
| CN | 102882612 A | 1/2013 |

OTHER PUBLICATIONS

PCT Notification of Transmittal of the International Search Report and the Written Opinion of the International Searching Authority, or the Declaration for International application No. PCT/CN2013/074604, Jan. 23, 2014.

(Continued)

*Primary Examiner* — Gerald Smarth
(74) *Attorney, Agent, or Firm* — Baker Botts, LLP

(57) ABSTRACT

The disclosure relates to a measurement configuration method and a measurement report method. The measurement configuration method comprises generating and transmitting a measurement configuration message to a user equipment. The measurement configuration message indicates a cell to be measured by the user equipment and an event for triggering a report of the measurement. The measurement configuration message also indicates whether the event if of a decoupling type or not. The measurement report method in the user equipment comprises receiving the measurement configuration message, and measuring and reporting according to the measurement configuration message. By configuring the message configuration message to indicate the type of the event, the user equipment can differentiate a decoupling case and a normal case, and only reports the measurement as required. There are also provided a base station performing the measurement configu- (Continued)

ration method and a user equipment performing the measurement configuration method.

23 Claims, 6 Drawing Sheets

(51) Int. Cl.
*H04L 12/801* (2013.01)
*H04W 72/04* (2009.01)
*H04W 76/04* (2009.01)
*H04W 88/08* (2009.01)

(56) References Cited

U.S. PATENT DOCUMENTS

| | | | |
|---|---|---|---|
| 2011/0170496 A1* | 7/2011 | Fong | H04L 5/0053 370/329 |
| 2013/0250868 A1* | 9/2013 | Yue | H04W 72/06 370/329 |
| 2014/0254516 A1* | 9/2014 | Lee | H04W 74/002 370/329 |

OTHER PUBLICATIONS

The soft-cell approach; Heterogeneous network deployments in LTE; Complementing high-power macro nodes with lower-power ones is an attractive means of meeting the predicted requirements for higher data rates and additional capacity by Stefan Parkvall et al., 2011.

HetNets in Mobile System Evolution by Ali Khayrallah, Director, Ericsson Research, San Jose, Mar. 2012.

3GPP TS 36.331 v11.3.0; Technical Specification; 3rd Generation Partnership Project; Technical Specification Group Radio Access Network; Evolved Universal Terrestrial Radio Access (E-UTRA); Radio Resource Control (RRC); Protocol specification (Release 11), Mar. 2013.

\* cited by examiner

MEASUREMENT CONFIGURATION METHOD, MEASUREMENT REPORT METHOD, BASE STATION AND USER EQUIPMENT USING THE SAME

PRIORITY

This nonprovisional application is a U.S. National Stage Filing under 35 U.S.C. §371 of International Patent Application Serial No. PCT/CN2013/074604, filed Apr. 24, 2013, and entitled "MEASUREMENT CONFIGURATION METHOD, MEASUREMENT REPORT METHOD, BASE STATION AND USER EQUIPMENT USING THE SAME."

TECHNICAL FIELD

The disclosure relates to communication technologies, and more particularly to a Radio Resource Management (RRM) configuration and report method in a heterogeneous network.

BACKGROUND

Unless otherwise indicated herein, the approaches described in this section are not prior art to the claims in this disclosure and are not admitted to be prior art by inclusion in this section.

The 3$^{rd}$ Generation Partnership Project (3GPP) is a globally applicable third generation mobile phone system specification that is a result of collaboration between various groups of telecommunications associations, including the European Telecommunications Standards Institute, the Association of Radio Industries and Businesses/Telecommunication Technology Committee (ARIB/TTC), China Communications Standards Association, and the Alliance for Telecommunications Industry Solutions. 3GPP work is ongoing with Universal Terrestrial Radio Access Network (UTRAN) Long Term Evolution (LTE). Long Term Evolution (LTE) is a next generation broadband communication technology developed by the 3rd Generation Partnership Project (3GPP) in order to meet high-speed requirements. A LTE system may realize high-speed packet-based communication at up to 100 Mbps in the downlink.

In 3GPP technical specification of Rel-8 or Rel-9, two kinds of radio resource measurement need to be performed by a User Equipment (UE), one is Radio Link Monitoring (RLM) measurement, and the other one is Radio Resource Management (RRM) measurement.

A heterogeneous environment is under discussion in LTE-Advanced (LTE-A), in which environment a plurality pico cells operating with relatively low transmission power are distributed in a macro cell operating with relatively high transmission power. For a UE located at the coverage boundary between a Macro cell and a Pico cell, if the received downlink signal from the Macro cell is stronger than that from the Pico cell, the UE is associated with the Macro cell and receive downlink signals from the Macro cell. While for the uplink, since the Pico cell is closer to the UE than the Macro cell, its is better select the Pico cell as the reception point of the UE, in order to reduce the transmit power of the UE and the interference to normal UEs in the Pico cell. Therefore, for this UE, the downlink serving cell is the Macro cell but the uplink serving cell is the Pico cell, which is called uplink and downlink decoupling.

FIG. 1 illustrates a scenario of a typical decoupling handover process. As shown in (A) of FIG. 1, Macro evolved NodeB (eNB) serves UE at both the uplink and downlink at the beginning. The UE moves around in the system. When the UE moves such that Pico eNB becomes closer to the UE than Macro eNB, the UE switches uplink bearers from Macro eNB to Pico eNB first, as shown in (B) of FIG. 1. If both the Macro eNB and the Pico eNB support decoupling, the UE will maintain its downlink carriers to Macro eNB and its uplink carriers to Pico eNB at the area where the signal power from Pico eNB is lower than that from Macro eNB. If the UE moves to be further closer to Pico eNB and that the signal power from Pico eNB is larger than that from Macro eNB, the UE switches its downlink bearers from Macro eNB to Pico eNB, as shown in (C) of FIG. 1.

The same criterion is applicable to the cell change from Pico to Macro. The downlink carriers are switched from Macro eNB to Pico eNB first when the signal power from the Macro eNB is larger than that from Pico eNB. After that, the uplink carriers are then switched from Macro eNB to eNB if needed. That is, when a decoupling handover occurs to the UE, it switches one-direction carriers first, and switches the other direction carriers later.

To activate or deactive uplink and downlink decoupling, the network has to rely on RRM measurement and report mechanism.

The current RRM measurement and report mechanism does not differentiate a decoupling handover case and a normal handover case, i.e., uplink and downlink carriers are switched together. In order to support the decoupling, the UE shall be configured to report the measurement when either the criteria for a normal handover or the criteria for a decoupling handover is satisfied. When a normal handover is to be decided, the measurement reported when the criteria for a decoupling handover is unuseful. Similarly, when a decoupling handover is to be cided, the measurement reported when the criteria for a normal handover is unuseful. Therefore, unnecessary Radio Resource Control (RRC) report is generated, which wastes the bandwidth resource of the network and the processing resource on the UE.

SUMMARY

An object of the disclosure is to provide a RRM configuration and report mechanism in a heterogeneous network, which is capable of effectively balancing the measurement report overhead and the Quality of Service (QoS) performance in the network.

According to a first aspect, there is provided a measurement configuration method used in a base station. The measurement configuration method comprises a step of generating a measurement configuration message for a user equipment. The measurement configuration message comprises measurement object information indicating a cell to be measured by the user equipment, and report configuration information defining an event for triggering a measurement report of the cell by the user equipment. The method further comprises a step of transmitting the generated measurement configuration message to the user equipment. The measurement configuration message shall indicate the feature of the event, i.e., whether the event is of a decoupling type or not.

Preferably, the measurement configuration message indicates whether the event is of a decoupling type or not by an explicit bit in the report configuration information.

Preferably, the report configuration information is ReportConfigEUTRA message.

Preferably, the measurement configuration message indicates whether the event is of a decoupling type or not by event identification of the event.

Preferably, the measurement configuration message further indicates transmission power of a serving cell in which the user equipment is served and transmission power of the cell to be measured by an additional Information Element (IE).

Preferably, the additional IE is included in MeasObjectEUTRA message.

Preferably, the measurement configuration method is performed in Radio Resource Control (RRC) connection reconfiguration process.

According to a second aspect, there is provided measurement report method used in a user equipment. The measurement report method comprises a step of receiving a measurement configuration message from a base station. The measurement configuration message comprises measurement object information indicating a cell to be measured by the user equipment, and report configuration information defining an event for triggering a measurement report of the cell by the user equipment. The measurement report method further comprises steps of measuring the cell indicated by the measurement object information, and reporting to the base station measurement of the cell when the event occurs. The measurement configuration message shall indicate whether the event is of a decoupling type or not.

Preferably, when the measurement configuration message indicates that the event is of a decoupling type, reporting measurement of the cell when the event occurs comprises reporting the measurement of the cell when the event occurs only if:
  both a serving cell in which the user equipment is served and the cell to be measured support the decoupling; and
  the serving cell and the cell to be measured have different transmission powers.

Preferably, the measurement report method further comprises a step of deriving the relationship between transmission powers of a serving cell in which the user equipment is served and the cell to be measured from cellIndividualOffset message included in the measurement object information.

Preferably, the measurement report method further comprises a step of determining transmission powers of a serving cell in which the user equipment is served and the cell to be measured from an additional Information Element (IE) in MeasObjectEUTRA message.

Preferably, when the measurement configuration message indicates that the event is not of a decoupling type, reporting measurement of the cell when the event occurs comprises reporting the measurement of the cell when the event occurs only if:
  at least one of a serving cell in which the user equipment is served and the cell to be measured does not support the decoupling; or
  the serving cell and the cell to be measured have the same transmission powers.

According to a third aspect, a base station is provided for performing a measurement configuration method. The base station comprises a processing unit and a transmitting unit. The processing unit is configured to generate a measurement configuration message for a user equipment. The measurement configuration message comprises measurement object information indicating a cell to be measured by the user equipment, and report configuration information defining an event for triggering a measurement report of the cell by the user equipment. The transmitting unit is configured to transmit the measurement configuration message generated by the processing unit to the user equipment. The measurement configuration message indicates whether the event is of a decoupling type or not.

According to a fourth aspect, a user equipment is provided for performing a measurement report method. The user equipment comprises a receiving unit, a measuring unit and a measurement report unit. The receiving unit is configured to receive a measurement configuration message from a base station. The measurement configuration message comprises measurement object information indicating a cell to be measured by the user equipment, and report configuration information defining an event for triggering a measurement report of the cell by the user equipment. The measuring unit is configured to measure the cell indicated by the measurement object information. The measurement reporting unit is configured to report to the base station measurement of the measuring unit. The measurement configuration message indicates whether the event is of a decoupling type or not.

According to embodiments of the disclosure, the user equipment is configured to perform RRC report by differentiating a normal case and a decoupling case, and thus unnecessary measurement report is avoided. Therefore, the measurement report overhead and QoS performance are balanced. Specifically, on the one hand, more accurate/frequency measurement report from the user equipment provides the network more possibilities to use more advanced algorithm to guarantee QoS of users, e.g., allocating resources, tuning related parameters and etc. On the other hand, more accurate/frequency measurement report from the user equipment costs available uplink load in the network, i.e., causes large signalling overhead. According to the disclosure, the user equipment decides the handover case first, i.e., a normal case or a decoupling case. Only the necessary report in a specific case is triggered. Accordingly, unnecessary measurement and report are avoided, which effectively reduces the bandwidth resource of the network and the processing resource on the user equipment.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail.

The techniques described herein may be used for various wireless communication networks such as CDMA, TDMA, FDMA, OFDMA, SC-FDMA and other networks. The terms "network" and "system" are often used interchangeably. The techniques described herein may be used for the wireless networks and radio technologies mentioned above as well as other wireless networks and radio technologies. For clarity, certain aspects of the techniques are described below for LTE, and LTE terminology is used in much of the description below.

Exemplary Wireless Communication System

Figure 1:
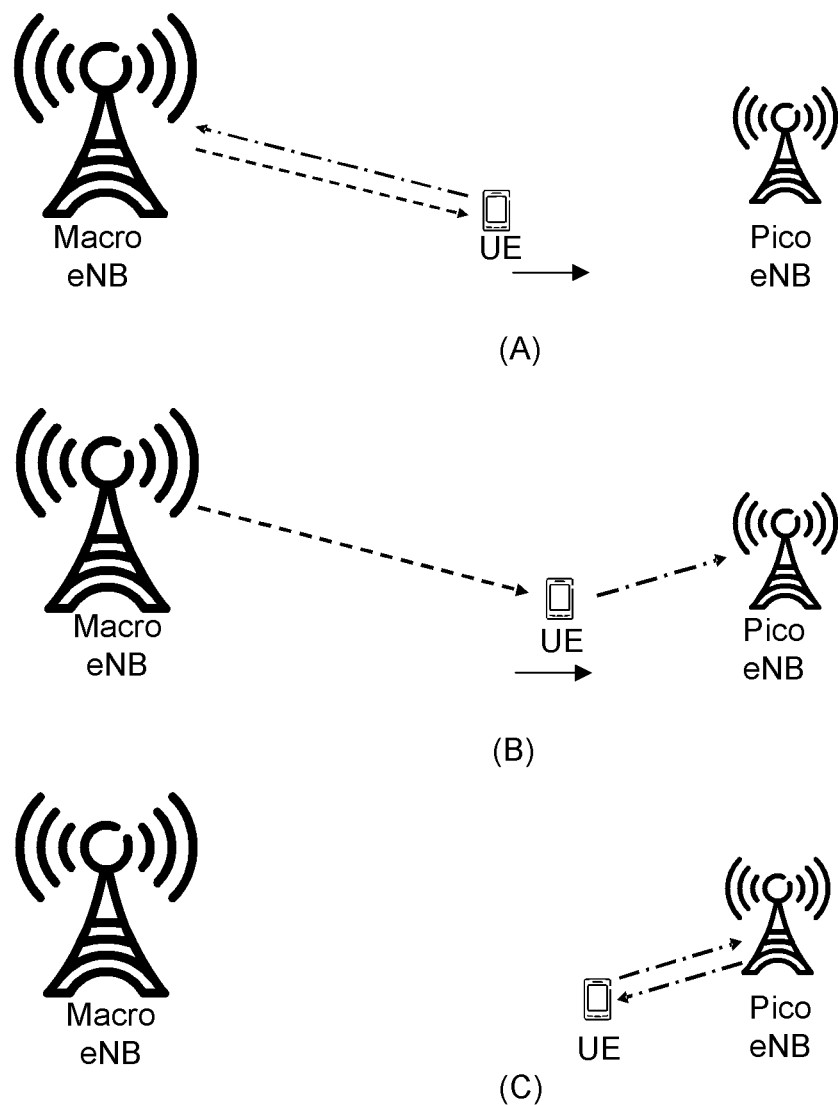
FIG. 1 illustrates a scenario of a typical decoupling handover process.
Figure 2:
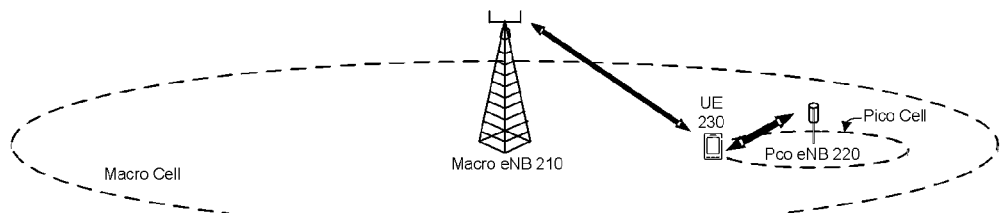
FIG. 2 illustrates a diagram of a wireless communication system where the disclosure may be implemented.

Referring now to FIG. 2, a diagram of a wireless communication system 200 where the disclosure may be implemented will be discussed. The wireless communication system 200 may include a number of evolved NodeBs (eNBs) and user equipments. An eNB may be a station that communicates with user equipments (UEs) and may also be referred to as a base station, a Node B, an access point, etc. Each eNB may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) by providing a relative higher transmission power and may allow unrestricted access by UEs with service subscription. A pico cell may cover a relatively small geographic area by providing a smaller transmission power and may allow unrestricted access by UEs with service subscription. A femto cell may cover a relatively small geographic area (e.g., a home) by providing an even smaller transmission power and may allow restricted access by UEs having association with the femto cell (e.g., UEs in a Closed Subscriber Group (CSG), UEs for users in the home, etc.). An eNB for a macro cell may be referred to as a macro eNB (i.e., a macro base station). An eNB for a pico cell may be referred to as a pico eNB (i.e., a pico base station). An eNB for a femto cell may be referred to as a femto eNB (i.e., a femto base station) or a home eNB.

The UEs may be dispersed throughout the wireless communication system 200, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a tablet, etc. A UE may be able to communicate with macro eNBs, pico eNBs, femto eNBs, relays, etc.

For simplicity, Macro eNB 210 and Pico eNB 220 are shown in FIG. 2 as examples of the eNBs. Furthermore, one UE, UE 230 is shown to be within the coverage of both Macro eNB 210 and Pico eNB 220, i.e., a Macro cell and a Pico cell. As Macro eNB 210 has a much higher transmission power than Pico eNB 220, the coverage is different for the Macro cell and the Pico cell. For UE 230 located in the macro cell coverage but at the boundary of the Pico cell, the received downlink signal from Macro eNB 210 is stronger than that from Pico eNB 220. Hence UE 230 is associated with the macro cell and receives downlink signals from the macro cell. For the uplink, since Pico eNB 220 is closer to UE 230 than Macro eNB 210, it is better to select Pico eNB 220 as the reception point of the uplink, in order to reduce the transmission power of UE 230 and the interference to other UEs in the Pico cell. Therefore, for UE 230, Macro eNB 210 is the downlink serving node while Pico eNB 220 is the uplink serving node.

RRM Measurement

When a UE is connected to the network, the eNB to which the UE connects configures the UE regarding which frequency/cells to measure and when to send the measurement report, in order for the network to be aware of the UE's location/mobility.

Figure 3:
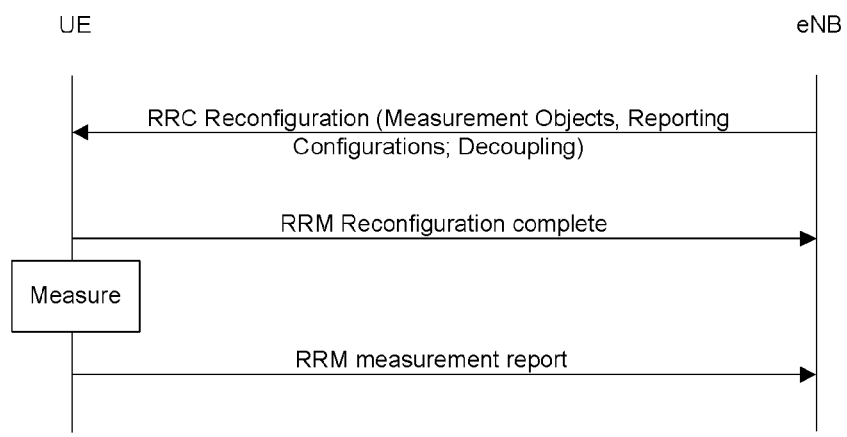
FIG. 3 shows a RRM measurement configuration and report signalling process according to an embodiment of the disclosure.

FIG. 3 shows a RRM measurement configuration and report signalling process according to the disclosure.

The eNB provides the measurement configuration applicable for a UE in RRC_CONNECTED by means of dedicated signalling, i.e. using the RRCConnectionReconfiguration message. The following measurement configurations can be signalled to the UE:

Measurement objects: The information regarding measurement objects defines on what the UE should perform the measurements—such as a carrier frequency. The measurement objects may also include a list of cells to be considered (white-list or black-list) as well as associated parameters, e.g. frequency- or cell-specific offsets.

Reporting configurations: The information regarding reporting configurations consists of the periodic or event-triggered criteria which cause the UE to send a measurement report, as well as the details of what information the UE is expected to report (e.g. the quantities, such as Received Signal Code Power (RSCP) for Universal Mobile Telecommunications System (UMTS) or Reference Signal Received Power (RSRP) for LTE, and the number of cells).

Measurement identities: The information regarding measurement identities identifies a measurement and defines the applicable measurement object and reporting configuration. Each measurement identity links one measurement object with one reporting configuration. By configuring multiple measurement identities, it is possible to link more than one measurement object to the same reporting configuration, as well as to link more than one reporting configuration to the same measurement object. The measurement identity is used as a reference number in the measurement report.

The UE confirms the receipt of RRCConnectionReconfiguration message by returning a RRM Reconfiguration complete message to the eNB. The UE then performs measurement on the measurement objects indicated in the RRCConnectionReconfiguration message, particularly in the information regarding measurement objects, and reports its measurements to the eNB at appropriate time defined by the reporting configurations indicated in the RRCConnectionReconfiguration message, particularly in the information regarding reporting configurations.

Once the UE is enabled for measuring, it can report any of the following:

The serving cell

Listed cells (i.e. cells indicated as part of the measurement object);

Detected cells on a listed frequency (i.e. cells which are not listed cells but are detected by the UE).

In 3GPP LTE R11 specification [Reference 1, 3GPP TS 36.331, Evolved Universal Terrestrial Radio Access (E-UTRA); Radio Resource Control (RRC), March, 2013], various RRM measurement events are defined for intra-RAT measurement, including Event A1. Serving cell becomes better than absolute threshold.

Event A2. Serving cell becomes worse than absolute threshold.

Event A3. Neighbour cell becomes better than an offset relative to the serving cell.

Event A4. Neighbour cell becomes better than absolute threshold.

Event A5. Serving cell becomes worse than one absolute threshold and neighbour cell becomes better than another absolute threshold, i.e., A2+A4.

Event A6. Intra-frequency neighbour becomes better than an offset relative to an SCell.

Reference 1 also defines, among others, a specific MeasObjectEUTRA information element which specifies information applicable for intra-frequency or inter-frequency E-UTRA cells and a specific ReportConfigEUTRA information element which specifies criteria for triggering of an E-UTRA measurement reporting event. The E-UTRA measurement reporting events are differentiated by their eventIds, which indicate a choice of E-UTRA event triggered reporting criteria.

Figure 4:
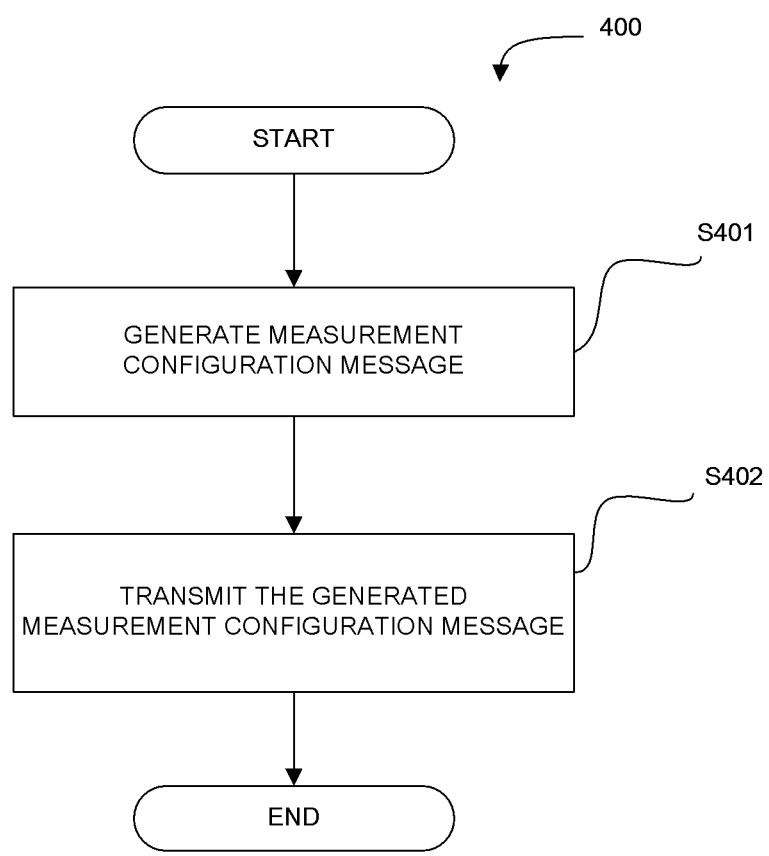
FIG. 4 shows a flowchart of a measurement configuration method according to an embodiment of the disclosure.

FIG. 4 shows a flowchart of a measurement configuration method 400 used in an eNB according to an embodiment of the disclosure.

As shown in FIG. 4, the method starts at step S401, where a measurement configuration message is generated at the eNB. The measurement configuration message may comprise measurement object information indicating a cell to be measured by the UE, and report configuration information defining an event for triggering a measurement report of the cell by the UE. The measurement configuration message also indicates whether the event is of a decoupling type or not. The method then proceeds to step S402, where the eNB transmits the generated measurement configuration message to the UE.

There are provided at least two ways to indicate whether the event is of a decoupling type or not, including for example Explicit way, where an explicit bit is set in the report configuration information. For example, an indication is set in the ReportConfigEUTRA (or its field), e.g., a bit DecouplingMode is set, where DecoupfingMode=Enabled/Disabled, which indicates that when DecoupfingMode=Enabled the corresponding report is only trigged when both the serving cell and the measured cell support the decoupling and the serving cell and the measured cell have different transmission power, and when DecouplingMode=Disabled the report is only trigged when at least one of the serving cell and the measured cell does not support the decoupling or the serving cell and the measured cell have the same transmission power.

Implicit way, where a new event is defined, which can be seen as an extension of one of A3, A5 and A6. For example, new events C3, C5 and C6 are defined as follows:

C2. Serving cell becomes worse than absolute threshold.

C5. Serving cell becomes worse than one absolute threshold and neighbour cell becomes better than another absolute threshold.

C6. Intra-frequency neighbour becomes better than an offset relative to an Scell.

The specific events C3, C5 and C6 are intended for decoupling cases. The event identification of an event directing to one of C3, C5 and C6 indicates that it is a decoupling case. The event identification of an event directing to one of A3, A5 and A6 indicates that it is not a decoupling case, but a normal case.

Figure 5:
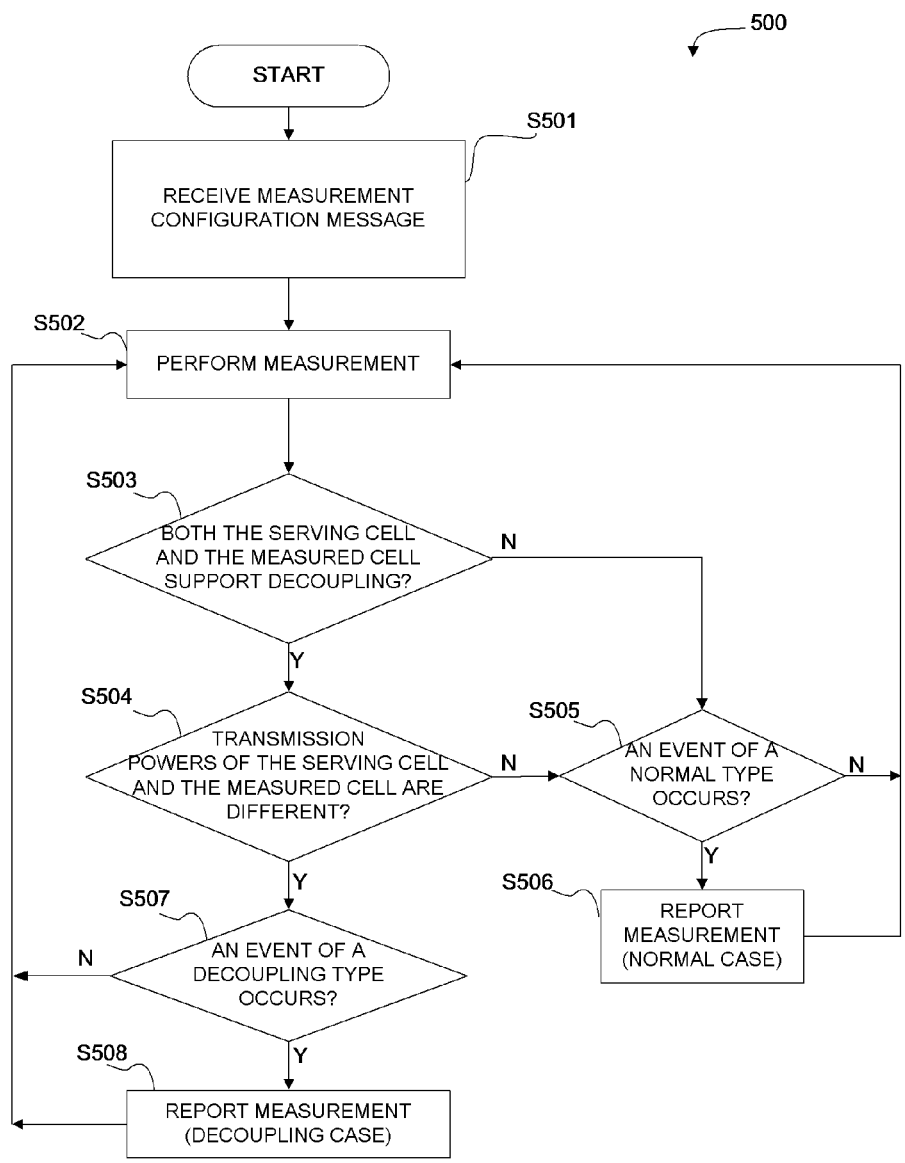
FIG. 5 shows a flowchart of a measurement report method according to an embodiment of the disclosure.

FIG. 5 shows a flowchart of a measurement report method 500 used in a UE according to an embodiment of the disclosure.

The method starts at step S501, where the UE receives a measurement configuration message from an eNB. The measurement configuration message may comprise measurement object information indicating a cell to be measured by the UE, and report configuration information defining an event for triggering a measurement report of the cell by the UE. The measurement configuration message also indicates whether the event is of a decoupling type or not.

The UE then performs measurement on the cell indicated by the measurement object information at step S502. The method proceeds to step S503, where is the UE determines whether both the serving cell and the measured cell support the decoupling. If it is determined that the serving cell and the measured cell both support the decoupling, the method proceeds to step S504, where the UE determines whether the serving cell and the measured cell have different transmission powers or not. If it is determined that the serving cell and the measured cell have different transmission powers, the method proceeds to step S507, where the UE determines whether an event of a decoupling type indicated in the measurement configuration message occurs. When the event occurs, the method proceeds to step S508, where the UE reports the measurement to the eNB. The method then turns to step S502, where the UE continuously performs measurement. If it is determined that at least one of the serving cell and the measured cell does not support the decoupling at step S503, or it is determined that the serving cell and the measured cell have the same transmission powers at step S504, the method proceeds to step S505, where the UE determines whether an event of a normal case (not a decoupling type) indicated in the measurement configuration message occurs. When the event of a normal case occurs, the method proceeds to step S506, where the UE reports the measurement to the eNB. The method then turns to step S502, where the UE continuously performs measurement.

In an embodiment, in order to determine whether the serving cell and the measured cell have the same transmission powers or not, the UE may derive the relationship between transmission powers of the serving cell and the measured cell from cellIndividualOffset as defined within measObjectEUTRA message.

In an alternative embodiment, the eNB may explicitly inform the UE of the transmission powers. For example, the eNB may include a cell-specific indication in MeasObjectEUTRA message, e.g., an additional Information Element (IE) to indicate LOWPowerCellList as a list of CellIndex and/or physCellId. The UE receiving the measurement configuration message looks up the cell identification of the serving cell and the measured cell in the IE of the MeasObjectEUTRA message to determine the transmission powers of the serving cell and the measured cell at step S504.

In the embodiment, the decoupling capabilities of the serving cell and of the measured cell may be broadcast by each eNB in the system information so that the UE may use the information in determining whether both cells support the decoupling or not.

According to the measurement report method 500 of the embodiment, the UE reports the measurement when the event occurs only if both the serving cell and the measured cell support the decoupling, and the serving cell and the measured cell have different transmission powers, when the measurement configuration message indicates that the event if of a decoupling case. For a normal case, the UE reports the measurement when the event occurs only if at least one of the serving cell and the measured cell does not support the decoupling, or the serving cell and the measured cell have the same transmission powers.

Exemplary Comparison of Conventional Mechanism and the New Mechanism

Both the normal and decoupling cases exist in a heterogeneous system. For a normal handover, a RRC measurement need to be configured, e.g., Event A3 offset as 2 dB. For a decoupling handover, two offsets are required as follows.

a. Assuming a cell change from a Macro cell with 46 dBm transmission power to a Pico cell with 30 dBm transmission power, for which we can set the cell-specific offset for Macro cell as 0 dB, Pico cell as 8 dB (this is set theoretically according to the power difference, i.e., (46−30)/2=8). To support the uplink and downlink decoupled mode, the two Event A3 offsets could be set as −8 dB and 8 dB. I.e., when UE moves from the Macro cell to the Pico cell, it switches the uplink carriers from the Macro cell to the Pico cell first when (PicoRSRP+8 dB)−MacroRSRP>−8 dB, and switches the downlink carriers from the Macro cell to the Pico cell later when (PicoRSRP+8 dB)−MacroRSRP>8 dB.

b. In the opposite direction, when UE moves from the Pico cell to the Macro cell, it switches the downlink carriers from the Pico cell to the Macro cell first when MacroRSRP−(PicoRSRP+8 dB)>−8 dB, and switches the uplink carriers from the Pico cell to the Macro cell later when MacroRSRP−(PicoRSRP+8 dB)>8 dB.

In the above, MacroRSRP denotes the RSRP of the Macro cell. Similarly, PicoRSRP denotes the RSRP of the Pico cell.

Figure 6:
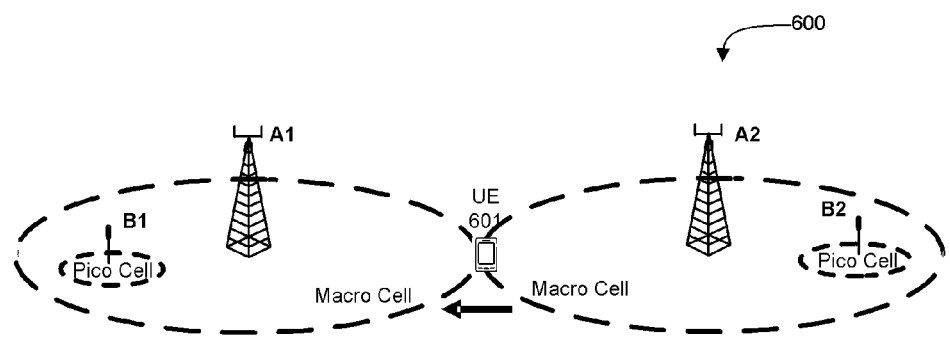
FIG. 6 shows an exemplary handover scenario where a UE moves from a Macro Cell to another Macro Cell in a heterogeneous network.

FIG. 6 shows an exemplary handover scenario 600 where a UE 601 moves from a Macro Cell to another Macro Cell in a heterogeneous network.

In the scenario, it is assumed that Cells A1 and A2 are Macro cells, Cells B1 and B2 are Pico cells. Cells A1, A2, B1 and B2 all support the decoupling.

According to the conventional LTE specification which does not differentiate a normal case and a decoupling case, in order to support the decoupling handover between Cell A1 and Cell B1 and between Cell A2 and Cell B2, two Event A3 offset are needed, i.e., two ReportConfigEUTRA messages, e.g., reportConfigId=1 for −8 dB Event A3 offset, and reportConfigId=2 for 8 dB Event A3 offset, and Cells A1, A2, B1 and B2 are included in the corresponding MeasObjectEUTRA (e.g., MeasObjectId=1) which is linked to both reportConfigId=1 and reportConfigId=2. In order to support the normal handover between Cell A1 and Cell A2, one Event A3 offset is needed, i.e., a ReportConfigEUTRA message, e.g., reportConfigId=3 for 2 dB Event A3 offset, and Cell A1 and Cell A2 are included in the corresponding MeasObjectEUTRA (e.g., MeasObjectId=2) which is linked to reportConfigId=3.

When UE moves from Cell A1 to Cell A2, the conventional configuration causes unnecessary signalling overhead at −8 dB and 8 dB RSRP difference point, in addition to the report at 2 dB RSRP difference point as wanted.

According to the embodiments of the disclosure, two ReportConfigEUTRA messages for the decoupling handover case and a ReportConfigEUTRA message for the normal handover case are set. Each of the ReportConfigEUTRA messages will indicate that it is of a decoupling type or not. For example, in order to support the decoupling handover, reportConfigId=1 for −8 dB Event C3 offset, and reportConfigId=2 for 8 dB Event C3 offset are set, and MeasObjectEUTRA (e.g., MeasObjectId=1) which include Cells A1, A2, B1 and B2 is linked to both reportConfigId=1 and reportConfigId=2. In order to support the normal handover, reportConfigId=3 for 2 dB Event A3 offset is set, and MeasObjectEUTRA (e.g., MeasObjectId=2) which includes Cell A1 and Cell A2 is linked to reportConfigId=3.

When UE moves from Cell A1 to Cell A2, the UE first determines whether the serving cell (i.e., Cell A1) and the measured cell (i.e., Cell A2) both support the decoupling. In the embodiment, both Cell A1 and Cell A2 support the decoupling. The UE then determines whether they have different transmission powers. As shown in FIG. 6, they have the same transmission powers. Therefore, the UE determines that the handover is a normal case, i.e., not a decoupling case. Only reportConfigId=3 works for the case. When CellA2RARP−CellA1RARP>2 dB occurs, the UE report the measurement to the eNB. Even if (CellA2RARP+8 dB)−CellA1RARP>−8 dB or (CellA2RARP+8 dB)−CellA1RARP>8 dB occurs, the UE does not report to the eNB because reportConfigId=1 and reportConfigId=2 do not apply to the case.

Comparing with the conventional configuration, the unnecessary signalling overhead at −8 dB and 8 dB RSRP difference point is avoided.

Figure 7:
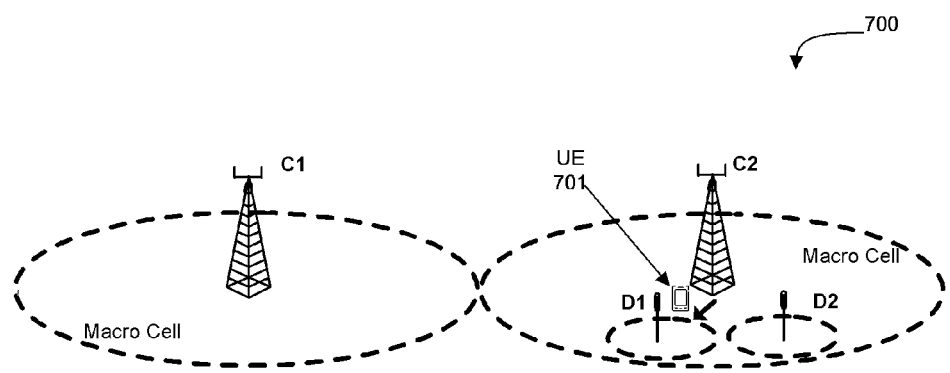
FIG. 7 shows an exemplary handover scenario where a UE moves from a Macro cell to a Pico Cell in a heterogeneous network.

FIG. 7 shows an exemplary handover scenario 700 where a UE 701 moves from a Macro cell to a Pico Cell in a heterogeneous network.

In the scenario, it is assumed that Cells C1 and C2 are Macro cells, Cells D1 and D2 are Pico cells. Cells C1, C2, D1 and D2 all support the decoupling.

According to the conventional LTE specification which does not differentiate a normal case and a decoupling case, in order to support decoupling between Cell C2 and Cell D1 and between Cell C2 and Cell D2, two Event A3 offset are needed, i.e., two ReportConfigEUTRA messages, e.g., reportConfigId=1 for −8 dB A3 offset, and reportConfigId=2 for 8 dB A3 offset, and Cells C2, D1 and D2 are included in the corresponding MeasObjectEUTRA (e.g., MeasObjectId=1) which is linked to both reportConfigId=1 and reportConfigId=2. In order to support a normal handover between Cell C1 and Cell C2 and between Cell D1 and Cell D2, one Event A3 offset is needed, i.e., one ReportConfigEUTRA message, e.g., reportConfigId=3 for 2 dB Event A3 offset, and Cells C1, C2, D1 and D2 are included in the corresponding MeasObjectEUTRA (e.g., MeasObjectId=2) which is linked to reportConfigId=3.

When UE moves from Cell C2 to Cell D1, the conventional configuration causes extra signaling overhead at 2 dB RSRP difference point, in addition to the report at 8 dB RSRP and −8 dB RSRP difference points as wanted.

According to the embodiments of the disclosure, two ReportConfigEUTRA messages for the decoupling handover case and a ReportConfigEUTRA message for the normal handover case are set. Each of the ReportConfigEUTRA messages will indicate that that it is of a decoupling type or not. For example, in order to support the decoupling handover, reportConfigId=1 for −8 dB Event C3 offset, and reportConfigId=2 for 8 dB Event C3 offset are set, and MeasObjectEUTRA (e.g., MeasObjectId=1) which include Cells C2, D1 and D2 is linked to both reportConfigId=1 and reportConfigId=2. In order to support the normal handover, reportConfigId=3 for 2 dB Event A3 offset is set, and MeasObjectEUTRA (e.g., MeasObjectId=2) which includes Cells C1, C2, D1 and D2 is linked to reportConfigId=3.

When UE movers from Cell C2 to Cell D1, the UE first determines whether the serving cell (i.e., Cell C2) and the measured cell (i.e., Cell D1) both support the decoupling. In the embodiment, both Cell C2 and Cell D1 support the decoupling. The UE then determines whether they have different transmission powers. As shown in FIG. 7, they have different transmission powers. Therefore, the UE determines that the handover is a decoupling case. reportConfigId=1 and reportConfigId=2 work for the case. When (CellD1RARP+8 dB)−CellC2RARP>−8 dB or (CellD1 RARP+8 dB)−CellC2RARP>8 dB occurs, the UE report the measurement to the eNB. Even if CellD1 RARP−CellC2RARP>2 dB occurs, the UE does not report to the eNB because reportConfigId=2 does not apply to the case. Comparing with the conventional configuration, the unnecessary signalling overhead at 2 dB RSRP different point is avoided.

According to the embodiments of the disclosure, the measurement report overhead and QoS performance are compromised. Specifically, on the one hand, more accurate/frequency measurement report from the UE provides the network more possibilities to use more advanced algorithm to guarantee QoS of users, e.g., allocating resources, tuning related parameters and etc. On the other hand, more accurate/frequency measurement report from the UE costs available uplink load in the network, i.e., causes large signalling overhead. According to the embodiments of the disclosure, the UE decides the handover case first, i.e., a normal case or a decoupling case. Only the necessary report in a specific case is triggered. Accordingly, unnecessary measurement and report are avoided, which benefits both the network and the UE.

The foregoing embodiments take the events A3 and C3 as an example. It is obvious to those skilled in the art that the foregoing analysis is applicable to other events, such as A5 and A6.

Figure 8:
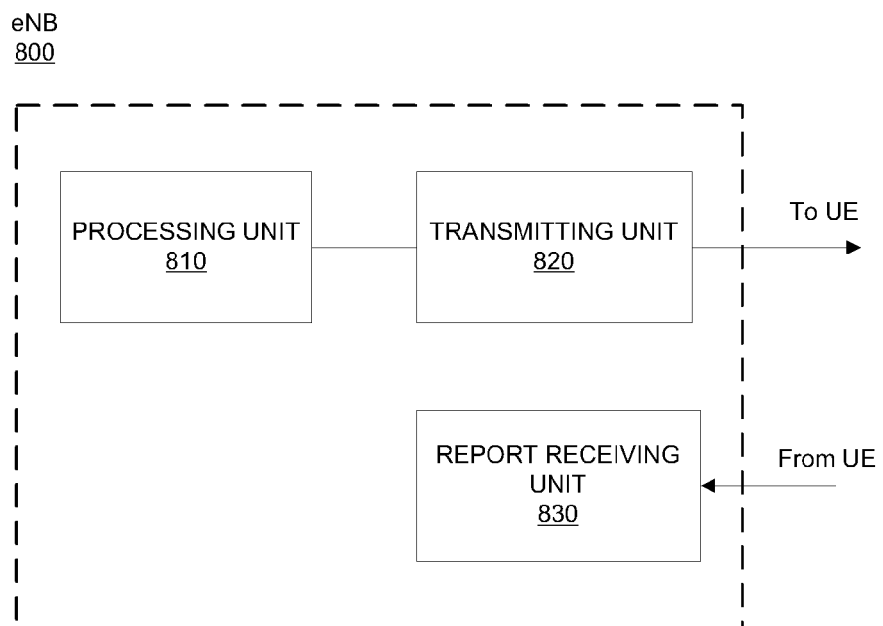
FIG. 8 illustrates a block diagram of an eNB according to an embodiment of the disclosure.

FIG. 8 illustrates a block diagram of an eNB 800 according to an embodiment of the disclosure.

As shown, the eNB 800 comprises a processing unit 810 and a transmitting unit 820. The processing unit 810 is configured to generate a measurement configuration message for a user equipment. The measurement configuration message comprises measurement object information indicating a cell to be measured by the user equipment, and report configuration information defining an event for triggering a measurement report of the cell by the user equipment. The measurement configuration message also indicates whether the event is of a decoupling type or not. The transmitting unit 820 is configured to transmit the measurement configuration message generated by the processing unit 810 to the user equipment.

In an embodiment, the measurement configuration message from the eNB 800 may indicate whether the event if of a decoupling type or not by an explicit bit in the report configuration information, e.g., a bit DecouplingMode in the ReportConfigEUTRA (or its field). In an alternative embodiment, the measurement configuration message may indicate that the event is of a decoupling type or not by cell identification of the event. For example, Events C2, C5, C6 are defined, and when the event is one of Events C2, C5 or C6, the event indicates that it is a decoupling case. When the event is one of Events A2, A5 or A6, the event indicates that it is a normal case.

The eNB 800 may be configured to explicitly inform the UE of the transmission powers of the serving cell and the measured cell. For example, the eNB may include a cell-specific indication in MeasObjectEUTRA message, e.g., an additional Information Element (IE) to indicate LOWPowerCellList as a list of CellIndex and/or physCellId.

The eNB 800 may further comprises a report receiving unit 803 configured to receive the measurement reported from the UE.

Figure 9:
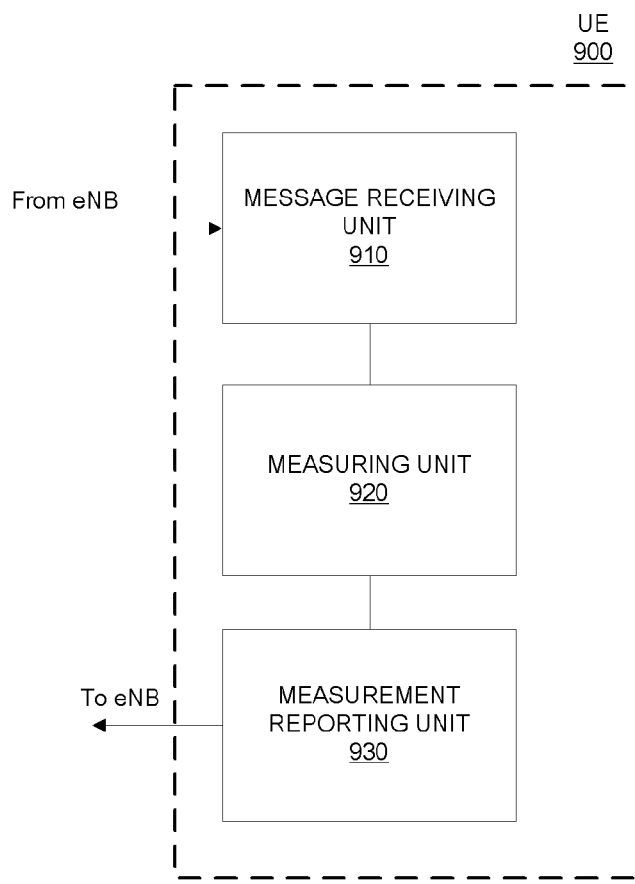
FIG. 9 illustrates a block diagram of a UE according to an embodiment of the disclosure.

FIG. 9 illustrates a block diagram of a UE 900 according to an embodiment of the disclosure.

As shown, UE 900 comprises a message receiving unit 910, a measuring unit 920 and a measurement reporting unit 930. The message receiving unit 910 is configured to receive a measurement configuration message from an eNB. The measurement configuration message may comprise measurement object information indicating a cell to be measured by UE 900, and report configuration information defining an event for triggering a measurement report of the cell by UE 900. The measurement configuration message also indicates whether the event is of a decoupling type or not. The measuring unit 920 is configured to perform measurement on the cell indicated by the measurement object information. The measurement reporting unit 930 is configured to report to the eNB measurement of the measuring unit 920. When the measurement configuration message indicates that the event is of a decoupling type, the measurement reporting unit 930 is configured to report the measurement when the event occurs only if both a serving cell in which the user equipment is served and the measured cell support the decoupling, and the serving cell and the measured cell have different transmission powers. When the measurement configuration message indicates that the event is not of a decoupling type, the measurement reporting unit 930 is configured to report the measurement when the event occurs only if at least one of the serving cell and the measured cell does not support the decoupling, or the serving cell and the measured cell have the same transmission powers.

In an embodiment, in order to determine whether the serving cell and the measured cell have the same transmission powers or not, the UE 900 may be configured to derive the relationship between transmission powers of the serving cell and the measured cell from cellIndividualOffset as defined within measObjectEUTRA message.

In an alternative embodiment, the UE 900 may be configured to determine transmission powers of a serving cell in which the user equipment is served and the cell to be measured from an additional Information Element (IE) in MeasObjectEUTRA message. The eNB indicates the transmission powers in the IE.

It should be noted that the eNB 800 as shown in FIG. 8 and UE 900 as shown in FIG. 9 may include more or fewer elements than shown, in various arrangements, and the scope of the claimed subject matter is not limited in this respect. The processing unit 810, the measuring unit 920 and the measurement reporting unit 930 may comprise a controller or a processor comprising e.g. any suitable Central Processing Unit, CPU, microcontroller, Digital Signal Processor, DSP, etc. The transmitting unit 820 and the reporting receiving unit 830 may be combined into a single unit, e.g., a transceiver or a receiving and transmitting antenna array. Similarly, the message receiving unit 910 and the measurement reporting unit 930 may be incorporated into a single unit such as a transceiver or an antenna array.

The foregoing description of implementations provides illustration and description, but is not intended to be exhaustive or to limit the disclosure to the precise form disclosed. Modifications and variations are possible in light of the above teachings, or may be acquired from practice of the disclosure. For example, while blocks have been described with regard to FIGS. 4 and 5 in a specific order, the order of the blocks may be modified in other implementations consistent with the principles of the disclosure. Further, non-dependent blocks may be performed in parallel.

Aspects of the present disclosure may also be implemented in methods and/or computer program products. Accordingly, the disclosure may be embodied in hardware and/or in hardware/software (including firmware, resident software, microcode, etc.). Furthermore, the present disclosure may take the form of a computer program product on a computer-usable or computer-readable storage medium having computer-usable or computer-readable program code embodied in the medium for use by or in connection with an instruction execution system. The actual software code or specialized control hardware used to implement embodiments described herein is not limiting of the disclosure. Thus, the operation and behaviour of the aspects were described without reference to the specific software code—it being understood that those skilled in the art will be able to design software and control hardware to implement the aspects based on the description herein.

Furthermore, certain portions of the disclosure may be implemented as "logic" that performs one or more functions. This logic may include hardware, such as an application specific integrated circuit or field programmable gate array or a combination of hardware and software.

It should be emphasized that the term "comprises/comprising" when used in this specification is taken to specify the presence of stated features, integers, steps, components or groups but does not preclude the presence or addition of one or more other features, integers, steps, components or groups thereof.

No element, act, or instruction used in the present disclosure should be construed as critical or essential to the disclosure unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

The foregoing description gives only the embodiments of the present disclosure and is not intended to limit the present disclosure in any way. Thus, any modification, substitution, improvement or like made within the spirit and principle of the present disclosure should be encompassed by the scope of the present disclosure.

What is claimed is:

1. A measurement configuration method used in a base station, the measurement configuration method comprising:
   generating a measurement configuration message for a user equipment, the measurement configuration message comprising:
   measurement object information indicating a cell to be measured by the user equipment, and
   report configuration information defining an event for triggering a measurement report of the cell by the user equipment, and
   transmitting the generated measurement configuration message to the user equipment,
   wherein the measurement configuration message indicates whether the event is of a decoupling type or not.

2. The method of claim 1, wherein the measurement configuration message indicates whether the event is of a decoupling type or not by an explicit bit in the report configuration information.

3. The method of claim 1, wherein the report configuration information is ReportConfigEUTRA message.

4. The method of claim 1, wherein the measurement configuration message indicates that the event is of a decoupling type or not by event identification of the event.

5. The method of claim 1, wherein the measurement configuration message further indicates transmission power of a serving cell in which the user equipment is served and transmission power of the cell to be measured by an additional Information Element (IE).

6. The method of claim 5, wherein the additional IE is included in MeasObjectEUTRA message.

7. The method of claim 1, wherein the measurement configuration method is performed in Radio Resource Control (RRC) connection reconfiguration process.

8. A measurement report method used in a user equipment, the measurement report method comprising:
   receiving a measurement configuration message from a base station, the measurement configuration message comprising:
   measurement object information indicating a cell to be measured by the user equipment, and
   report configuration information defining an event for triggering a measurement report of the cell by the user equipment,
   measuring the cell indicated by the measurement object information, and
   reporting to the base station measurement of the cell when the event occurs,
   wherein the measurement configuration message indicates whether the event is of a decoupling type or not.

9. The method of claim 8, wherein when the measurement configuration message indicates that the event is of a decoupling type, reporting measurement of the cell when the event occurs comprises reporting the measurement of the cell when the event occurs only if:
   both a serving cell in which the user equipment is served and the cell to be measured support the decoupling; and
   the serving cell and the cell to be measured have different transmission powers.

10. The method of claim 8, further comprising a step of deriving the relationship between transmission powers of a serving cell in which the user equipment is served and the cell to be measured from cellIndividualOffset message included in the measurement object information.

11. The method of claim 8, further comprising a step of determining transmission powers of a serving cell in which the user equipment is served and the cell to be measured from an additional Information Element (IE) in MeasObjectEUTRA message.

12. The method of claim 8, wherein when the measurement configuration message indicates that the event is not of a decoupling type, reporting measurement of the cell when the event occurs comprises reporting the measurement of the cell when the event occurs only if:
- at least one of a serving cell in which the user equipment is served and the cell to be measured does not support the decoupling; or
- the serving cell and the cell to be measured have the same transmission powers.

13. A base station, comprising:
a processing unit configured to generate a measurement configuration message for a user equipment, the measurement configuration message comprising:
measurement object information indicating a cell to be measured by the user equipment, and
report configuration information defining an event for triggering a measurement report of the cell by the user equipment, and
a transmitting unit configured to transmit the measurement configuration message generated by the processing unit to the user equipment,
wherein the measurement configuration message indicates whether the event is of a decoupling type or not.

14. The base station of claim 13, wherein the measurement configuration message indicates whether the event is of a decoupling type or not by an explicit bit in the report configuration information.

15. The base station of claim 13, wherein the report configuration information is ReportConfigEUTRA message.

16. The base station of claim 13, wherein the measurement configuration message indicates that the event is of a decoupling type or not by event identification of the event.

17. The base station of claim 13, wherein the measurement configuration message further indicates transmission power of a serving cell in which the user equipment is served and transmission power of the cell to be measured by an additional Information Element (IE).

18. The base station of claim 17, wherein the additional IE is included in MeasObjectEUTRA message.

19. A user equipment, comprising
a receiving unit configured to receive a measurement configuration message from a base station, the measurement configuration message comprising:
measurement object information indicating a cell to be measured by the user equipment, and
report configuration information defining an event for triggering a measurement report of the cell by the user equipment,
a measuring unit configured to measure the cell indicated by the measurement object information, and
a measurement reporting unit configured to report to the base station measurement of the measuring unit,
wherein the measurement configuration message indicates whether the event is of a decoupling type or not.

20. The user equipment of claim 19, wherein when the measurement configuration message indicates that the event is of a decoupling type, the measurement reporting unit is configured to report the measurement when the event occurs only if:
- both a serving cell in which the user equipment is served and the cell to be measured support the decoupling; and
- the serving cell and the cell to be measured have different transmission powers.

21. The user equipment of claim 19, wherein the user equipment derives the relationship between transmission powers of a serving cell in which the user equipment is served and the cell to be measured from cellIndividualOffset message included in the measurement object information.

22. The user equipment of claim 19, wherein the user equipment determines transmission powers of a serving cell in which the user equipment is served and the cell to be measured from an additional Information Element (IE) in MeasObjectEUTRA message.

23. The user equipment of claim 19, wherein when the measurement configuration message indicates that the event is not of a decoupling type, the measurement reporting unit is configured to report the measurement when the event occurs only if:
- at least one of a serving cell in which the user equipment is served and the cell to be measured does not support the decoupling; or
- the serving cell and the cell to be measured have the same transmission powers.

* * * * *